NON-RECIPROCAL MAGNETIC TRANSMISSION PATHS FORMED IN THIN MAGNETIC FILMS

Filed Jan. 22, 1968

INVENTORS.
ROBERT J. SPAIN
HARVEY I. JAUVTIS
BY John A. Lahive, Jr.
ATTORNEYS 3,465,316

NON-RECIPROCAL MAGNETIC TRANSMISSION PATHS FORMED IN THIN MAGNETIC FILMS

Robert J. Spain, Paris, France, and Harvey I. Jauvtis, Belmont, Mass., assignors, by mesne assignments, to Cambridge Memory Systems, Inc., Framingham, Mass., a corporation of Massachusetts Filed Jan. 22, 1968, Ser. No. 699,445
Int. Cl. G11b 5/74
U.S. Cl. 340—174 8 Claims

ABSTRACT OF THE DISCLOSURE

Non-reciprocal transmission paths are formed in thin magnetic films in order to serve as magnetic diodes between magnetic domain tip logic elements. The non-reciprocal characteristic is produced by patterning the transmission path either to have a branch dead end channel with the field from a domain tip in the branch inhibiting delayed transmission through the main channel or with the continuing channel emerging from the side of the main channel so that the domain tip can be propagated from the continuing channel into the main channel but is inhibited from propagating from the main channel into the containing channel.

Field of the invention

This invention relates in general to magnetically controlled logic systems and more particularly to the construction of non-reciprocal magnetic transmission paths in thin anisotropic magnetic films.

Prior art

The design and construction of operating logic systems based on the propagation of domains of reversed magnetization in anisotropically magnetized films is known in the art. While there are a variety of mechanisms for propagation of domains of reversed magnetization, such as Bloch wall motion and Nèel wall motion, one method of propagation which has proven particularly advantageous is domain tip propagation. In domain tip propagation, a relatively narrow low coercive force channel is formed in an anisotropically magnetized film. A small domain of reversed magnetization is then nucleated at some point in the channel by the application of a localized switching field of sufficient magnitude. This small domain, which is lenticular shaped with a roughly triangular shaped leading edge, may then be propagated along the channel by the application of an intermediate magnitude switching field. The magnitude of this propagating field should be below the level required for nucleating new domains and the direction in which it is applied will control the direction in which the domain is propagated. By appropriate arrangement of the channels in a film, logical systems including elements such as AND gates, OR gates and the like may be constructed. Such a system is described in the co-pending U.S. patent application Ser. No. 520,195, assigned to the assignee of the entire right, title and interest of the present application.

Summary of the invention

In the present invention, low coercive force channels are formed in thin anisotropically magnetized films in a configuration such that the transmission of domains of reversed magnetization along these channels is non-reciprocal. Thus domains of reversed magnetization may be propagated along these low coercive force paths in one direction, however, the propagation of a domain along the same path in the opposite direction is strongly inhibited. These non-reciprocal paths may then be considered the equivalent of "diodes" in a magnetically operated logic system.

There are two basic types of low coercive force path configuration which give rise to the unidirectional transmission characteristic necessary for the operation of these magnetic diodes. One such basic configuration may be referred to as a self-inhibiting gate. In this configuration the normal transmission path is a relatively narrow low coercive force path extending through the aniostropic film. The self inhibiting gate is formed by an additional small section of low coercive path which branches from the main transmission path and runs parallel to and close beside it for a short distance before it terminates. This branch extends in only one direction beside the main transmission path from the intersection. Immediately after the intersection the main transmission path narrows slightly and a domain of reversed magnetization propagated along this narrower portion will decrease in velocity. If a domain of reversed magnetization is nucleated somewhere within the main transmission path and propagated along it in the same direciton as the branch extends, then, upon reaching the intersection, the domain of reversed magnetization will fan out so that it is propagated in both the branch and the main channels from the intersection. Since the main channel is narrowed the tip of the reversed domain will arrive at the end of the branch channel before arriving at a parallel point in the main channel. The stray magnetic field from the earlier arriving tip in the branch channel inhibits the continued propagation of the domain tip through the main channel and thus a drive field which is sufficient to propagate the domain of reversed magnetization along the nondiode portion of the main transmission channel is insufficient to propagate it through this self-inhibiting gate portion. On the other hand, if a domain of reversed magnetization is being propagated in the opposite direction so that it traverses the narrowed portion of the main transmission channel before it reaches the intersection there is no such inhibiting acting and the drive field will propagate the domain of reversed magnetization along the main transmission path in this direction without inhibition.

The other basic configuration of low coercive force path to achieve this unidirectional action is one which takes advantage of the geometric properties of the leading edge of the domain tip. As mentioned earlier, this leading edge has a roughly triangular shape and, within the confines of a relatively narrow low coercive force channel, the field necessary to propagate the domain tip along the axis of the channel is much less than the field necessary to occasion lateral movement of the triangular leading edge into a channel branching from the side of the main channel. If the patch is arranged such that the main transmission path terminates and the continuing path is branched from an intersection with the side of the channel, then a domain of reversed magnetization propagated along the main path towards this termination will not continue through the intersection into the sideways branched path and hence propagation in this direction is inhibited. On the other hand a domain of reversed magnetization which is propagated along the branched path toward the intersection will continue into the main path and along it and is therefore not inhibited. Thus again in this configuration the domain tip is preferentially propagated in one direction.

Description of a preferred embodiment

Figure 1:
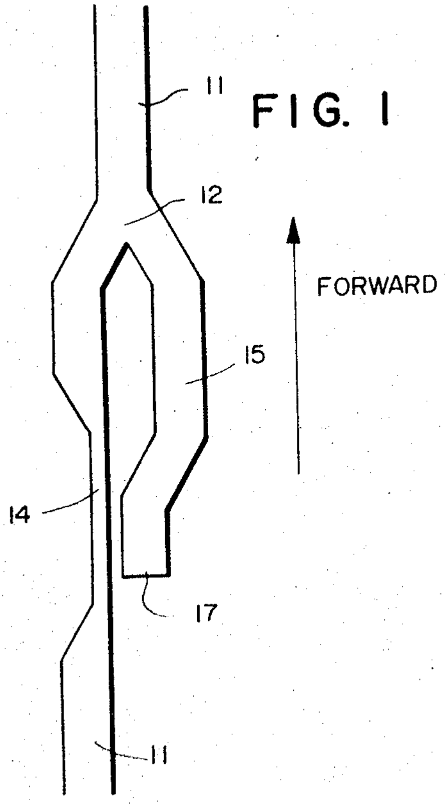
FIG. 1 is an illustration in diagrammatic form of a low coercive force path pattern in an anisotropic magnetic film, which pattern forms a non-reciprocal transmission element in accordance with the principles of this invention.

With reference now to FIG. 1, there is illustrated a low coercive force pattern for a self-inhibiting gate forming a non-reciprocal magnetic transmission path. The transmission path pattern is formed in a magnetic medium such as a ferromagnetic film typically composed of 71.5% nickel, 15.5% iron and 13% cobalt, the thickness of the film being approximately 1500 A. A number of techniques may be employed to form these low coercive force paths. These techniques include roughening of the substrate, and chemical processing or depositing of different layers of material underneath the film to increase the coercive force everywhere in the film except the selected paths. Patterns have been prepared by evaporating aluminum on a glass substrate, then chemically etching the pathways, followed by deposit of the ferromagnetic film.

In the self-inhibiting gate structure of FIG. 1 the main transmission channel 11, which typically would have a width of about 3 mils is narrowed at section 14 to a width of about 1 mil and then returns to a width of about 3 mils. In this configuration a branch path 15 is joined with the main transmission path 11 at intersection 12. The branch path is substantially the same width as the main transmission channel and extends from the intersection 12 along beside the channel so that it is parallel and close to the narrowed section 14. This branch 15 then terminates.

A domain of reversed magnetization, which has been nucleated in the main channel, may be transmitted in the forward direction along this channel by the application of a switching field of sufficient magnitude. A domain propagated in the forward direction will pass through the narrowed section and intersection 12 before propogating into the branch channel 15 and hence is not inhibited by the stray field from the branch channel.

If, however, a domain of reversed magnetization is propagated in the opposite direction along the transmission channel 11, the domain will fan out at intersection 12 and therefore be propagated down branch 15 as well as continue to be propagated along the main channel 11. The narrowed section 14 of the main transmission path delays the propagation of the domain of reversed magnetization and hence the domain tip will be propagated to the end of the branch 15 before the domain tip in the main channel crosses beyond the point parallel to the end 17 of the branch channel. The domain tip in the branch channel 15 has associated with it a stray field which produces an inhibiting field in the narrow section of the main channel 14 and hence tends to inhibit propagation of the domain tip through this main channel section 14. It has been found that a self-inhibiting structure of this pattern has a drive field tolerance of ±20%, that is the field required to propagate a domain through this non-reciprocal section in the reverse direction needs to be approximately 1½ times the field required to propagate a domain of reversed magnetization through the section in the forward direction. A typical value for the required forward drive field for the film, as described, is a field of approximately 4 oersteds, while the drive field required to propagate a domain in the reverse direction is 6 oersteds.

Figure 2:
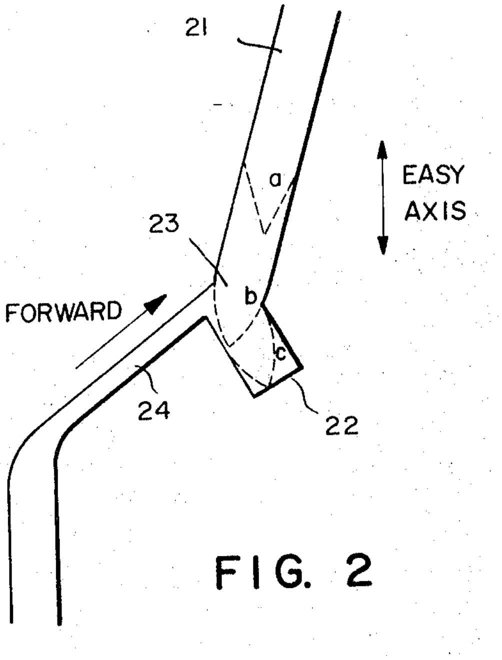
FIG. 2 is an illustration in diagrammatic form of a second pattern of low coercive force path in an anisotropic magnetic film which pattern forms a non-reciprocal transmission path in accordance with the principles of this invention.

In FIG. 2 there is shown a configuration for a non-reciprocal path in which the unidirectional action arises from the geometric shape of the domain tip. The same thin film composition and techniques may be employed as were used for the pattern illustrated in FIG. 1. In this configuration the main transmission channel 21, which again would have a typical width of 3 mils, is merged with a terminating section 22 at intersection 23. The terminating section 22 intersects the main channel section 21 at an angle of approximately 120°. The main channel 21 may be oriented at any one of a number of different angles to the easy axis of magnetization of the film, however the optimum angle between the easy axis and the main channel 21 is about 30°. From the outer portion of the intersection 23 a narrow continuing branch 24 of the main channel emerges. This continuing branch 24 may have a width of approximately 1 mil in its initial portion and would normally then be widened to a width of approximately 3 mils.

A switching field sufficient to propagate a domain of reversed magnetization along the continuing branch section 24 of the main transmission channel in the forward direction, is also sufficient to propagate this domain through the intersection 23 and continue it along the main transmission path 21. This same magnitude field is sufficient to propagate a domain of reversed magnetization along the main channel 21 in the reverse direction only up to the point of the intersection 23. The action which then takes place, is best illustrated by the dotted lines *a*, *b*, and *c* representing successive positions of a domain tip propagated in the reverse direction along the channel 21. The shape of the tip is such that it moves from position *a* to position *b* without breaking through into the narrow section 24 of the continuing branch. Once the domain tip has passed by the intersection 23 to the position *c*, a much larger magnitude field is required in order to obtain the lateral wall motion of propagating the reversed domain into the narrowed section 24. If the path angle is inclined closer to the easy axis of magnetization, this inhibiting effect is decreased and, as earlier mentioned, the optimum forward-to-backward ratio is obtained when this channel is inclined at an angle of approximately 30°. A channel of this configuration with a main channel width of 3 mils and a continuing channel width of .8 mil has been constructed in which a switching field of 4 oersteds was sufficient to propagate a reversed domain in the forward direction, while it required a field of 10 oersteds to propagate a domain of reversed magnetization in the opposite direction. This non-reciprocal element then exhibited a drive field tolerance of ±45%.

Figure 3:
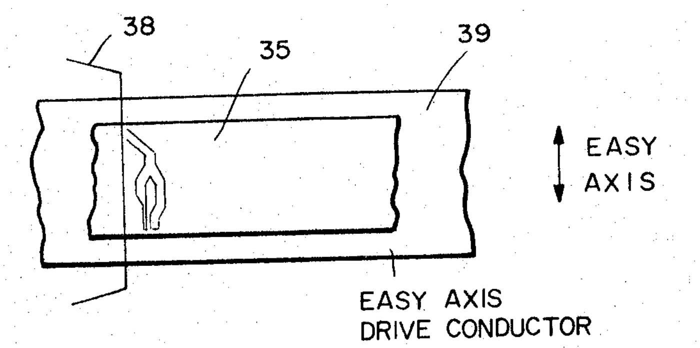
FIG. 3 is an illustration in diagrammatic form of a logic element constructed in accordance with the principles of this invention and including the associated field electrode.

In FIG. 3 there is illustrated a thin magnetic film structure with a typically patterned non-reciprocal element 36 formed in it. A nucleate conductor 38, which may be actuated by any suitable source of current is used to create a high localized magnetic field for nucleating a domain of reversed magnetization somewhere in the main channel. The nucleate conductor 38 may take the form, for example, of a thin wire. An easy axis drive conductor 39 which may be a single folded-over conductor is connected to a second suitable current source (not shown) for providing a drive field in either direction parallel to the easy axis in order to propagate the domain.

As indicated previously non-reciprocal transmission paths would typically be used in complex logic systems employing domain tip propagation. Such systems are described in detail in pending U.S. patent application Nos. 520,195 and 681,047, assigned to the assignee of the entire right, title and interest in the present invention.

In the described invention various modifications and improvements will now occur to those skilled in the art and the invention described herein should be construed as limited only by the spirit and scope of the appended claims.

What is claimed is:

1. A non-reciprocal transmission element for transmission of magnetic domains comprising, an anisotropic magnetic medium;

a channel formed within said magnetic medium, extending in a first direction along said medium, said channel being characterized by a coercive force substantially lower than the coercive force of said medium surrounding it, said low coercive force channel comprising a main section and a branch section, said branch section communicating with and extending from said main section in a direction opposite to said first direction, said branch section lying generally parallel and close to said main section, said main section being narrowed in the vicinity of said branch section, whereby a domain of reversed magnetization propagated in said opposite direction is propagated into said branch section and acts therein as an inhibiting force against propagation of said reversed domain along said main section.

2. A non-reciprocal element in accordance with claim 1 wherein said branch section terminates in the region of said narrowed portion of said main section.

3. A non-reciprocal element in accordance with claim 1 wherein said magnetic medium is a film substantially 1500 A. thick formed of 71.5% nickel, 15.5% iron and 13% cobalt.

4. A non-reciprocal transmission element for transmission of magnetic domains comprising, an anisotropic magnetic medium;

a channel formed within said magnetic medium, extending in a first direction along said medium, said channel being characterized by a coercive force substantially lower than the coercive force of said medium surrounding it, said low coercive force channel being formed of first and second sections, said first section being characterized by a first width, said second section having a substantially narrower width, said first and said second sections forming an intersection such that said second section is joined to and communicates with the side wall of said first section, said first section extending beyond said intersection in a direction generally opposite to said first direction, said first section terminating at a point displaced from said intersection in said generally opposite direction.

5. A non-reciprocal element in accordance with claim 4 wherein said medium is a thin ferromagnetic film having an easy axis of magnetization and wherein the portion of said first section preceding said intersection lies on an axis displaced 30° from said easy axis in the direction of the side from which said second section emerges.

6. A non-reciprocal element in accordance with claim 5 wherein said portion of said first section which continues beyond said intersection has an axis intersecting said first axis at approximately 120°.

7. A non-reciprocal transmission element in accordance with claim 6 wherein said first section of said low coercive force channel has a width of substantially 3 mils and wherein said second section of said channel has a width of substantially 1 mil.

8. A non-reciprocal transmission element for transmission of magnetic domains comprising:

an anisotropic magnetic medium;

a channel formed within said magnetic medium, extending in a first direction along said medium, said channel being characterized by a coercive force substantially lower than the coercive force of said medium surrounding it, first field producing means for generating within said channel a localized magnetic field of sufficient intensity to nucleate a domain of reversed magnetization and a second field producing means for generating in said magnetic medium a magnetic field of sufficient magnitude to propagate said nucleated domain along said channel in said first direction, the configuration of said channel being such that said generated field is insufficient to propagate said nucleated domain along said channel in a direction opposite to said first direction.

References Cited

Spain, R. J.: Domain Tip Propagation Logic, I.E.E.E., Transactions on Magnetics. Mag. 2 (3): pp. 347–351. September, 1966.

BERNARD KONICK, Primary Examiner

GARY M. HOFFMAN, Assistant Examiner